US005409333A

United States Patent [19]

Hu

[11] Patent Number: 5,409,333

[45] Date of Patent: Apr. 25, 1995

[54] MULTIPLY FUNCTIONED DRILL MEANS

[75] Inventor: Dye-Chung Hu, Taichung, Taiwan, Prov. of China

[73] Assignees: Ho-Shuenn Huang, Chia Yi; Dye-Jon Hu, Taichung Hsien, both of Taiwan, Prov. of China

[21] Appl. No.: 189,682

[22] Filed: Feb. 1, 1994

[51] Int. Cl.$^6$ .......................... B23B 51/12; B25F 3/00

[52] U.S. Cl. .................................. 408/239 A; 7/158; 7/165; 279/14; 279/905; 408/241 R

[58] Field of Search ................. 279/14, 143, 145, 905; 408/238, 239 A, 239 R, 241 R; 7/158, 165

[56] References Cited

U.S. PATENT DOCUMENTS

| | | | |
|---|---|---|---|
| 3,484,114 | 12/1969 | Rodin | 408/241 R |
| 4,218,795 | 8/1980 | Ernst et al. | 7/158 |
| 4,791,690 | 12/1988 | Kuang-Wu | 7/165 |
| 4,796,319 | 1/1989 | Taft | 7/165 |
| 5,129,118 | 7/1992 | Walmesley | 7/165 |
| 5,191,666 | 3/1993 | Corbin | 7/165 |
| 5,313,680 | 5/1994 | Ringler | 7/158 |

FOREIGN PATENT DOCUMENTS

| | | | |
|---|---|---|---|
| 2822372 | 11/1979 | Germany | 7/158 |
| 2063114 | 4/1981 | United Kingdom | 279/145 |

*Primary Examiner*—Daniel W. Howell

[57] ABSTRACT

A drill includes: a drill housing having a chuck collar of the drill made as a polygonal prism or a cylindrical collar having at least a secant flat surface formed thereon, a central drilling tool axially mounted in the drill housing, and a sleeve member having a hollow bore portion centrally formed through the sleeve member, having a coupling adapter formed on a proximal end of the sleeve member concentrically detachably secured to the chuck collar of the drill housing and having a screw driver member detachably mounted on a distal end of the sleeve member, whereby upon coupling of the sleeve member secured with the screw driver member onto the chuck collar of the drill, the hollow sleeve member on the drill will encase the central drilling tool previously axially mounted in the drill housing without first dismantling the central drilling tool for convenient replaceable uses of the drill.

7 Claims, 3 Drawing Sheets

MULTIPLY FUNCTIONED DRILL MEANS

BACKGROUND OF THE INVENTION

When it is intended to electrically operate a screw driver by a conventional electric or hand drill, a drilling tool or bit should be first dismantled from a chuck of the drill and the screw driver is then clamped on the chuck of the drill housing for screw driving purpose. It is quite inconvenient for such a replacing operation by detachably and replaceably mounting the drilling tool or the screw driver on the drill housing. If two hand tools, namely one for the drill and the other for the screw driver, are simultaneously prepared for their parallel uses, their equipment cost and handling inconvenience may be increased.

SUMMARY OF THE INVENTION

The object of the present invention is to provide a drill, either electrically driven or pneumatically driven, including: a drill having a chuck collar of the drill made as a polygonal prism or a cylindrical collar having at least a secant flat surface formed thereon, a central drilling tool axially mounted in the drill, and a sleeve member having a hollow bore portion centrally formed in the sleeve member, having a coupling adapter formed on a proximal end of the sleeve member concentrically detachably secured to the chuck collar of the drill and having a screw driver member detachably mounted on a distal end of the sleeve member, whereby upon coupling of the sleeve member secured with the screw driver member on the chuck collar of the drill, the hollow sleeve member on the drill will encase the central drilling tool previously axially mounted in the drill without first dismantling the central drilling tool for convenient replaceable uses of the drill.

DETAILED DESCRIPTION

Figure 1:
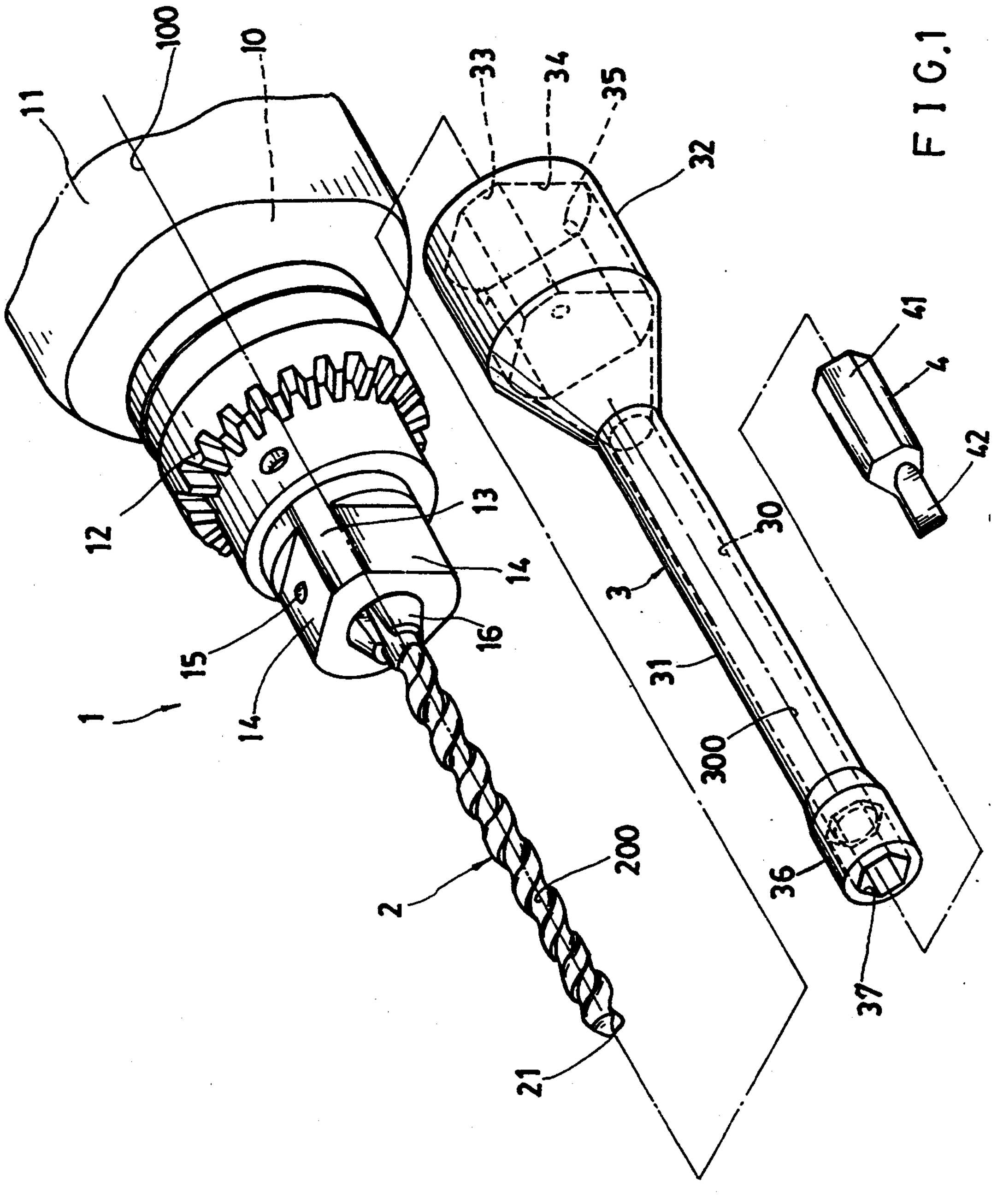
FIG. 1 is an exploded view of the present invention.

As shown in the drawing figures, the present invention comprises: a drill 1, a central drilling tool 2 axially mounted in the drill 1, a transmission member 3 concentrically mounted on the drill 1 to surround the central drilling tool 2, and at least a replaceable tool unit 4 detachably mounted on the transmission member 3.

The drill 1 may be electrically or pneumatically driven and includes: a drill housing 11 having a chuck 12 formed on a front portion of the drill housing 11, a collar 13 retained in the chuck 12 and confining a plurality of jaws 16 for clamping the central drilling tool 2 in the jaws 16, at least a secant flat surface 14 longitudinally formed on a circumferential surface of the collar 13 generally cylindrical shaped, and at least a resilient ball 15 resiliently held in the collar 13 for resiliently frictionally retaining the transmission member 3 on the drill 1.

The resilient ball 15 is retained in a spring socket 152 recessed in the collar 13 especially in the secant flat surface 14 of the collar 13, and a tension spring 151 normally urging the ball 15 outwardly.

The transmission member 3 includes: a sleeve member 31 having a hollow bore portion 30 longitudinally formed in the sleeve member 31 for encasing the central drilling tool 2 in the hollow bore portion 30, a coupling adapter 32 formed on a proximal end of the sleeve member 31 and having a coupling socket 33 recessed in the coupling adapter 32 for coupling the collar 13 of the drill, a ball recess 35 recessed in the coupling socket 33 of the coupling adapter 32 and resiliently engaging the resilient ball 15 on the collar 13 of the drill 1, a driving head member 36 formed on a distal end of the sleeve member 31 opposite to the coupling adapter 32 and having a driving socket 37 generally polygonal (such as hexagonal) shaped and recessed in the driving head member 36 for rotatably driving an external object (not shown), for example, for tightening a polygonal (such as hexagonal) nut when driven by the drill 1 electrically or pneumatically.

The coupling socket 33 in the coupling adapter 32 of the transmission member 3 may be formed with at least a flat surface 34 on an inside wall of the coupling socket 33 to be engageable with the collar 13 having a secant flat surface 14 longitudinally formed on the collar 13 which is generally cylindrical shaped.

Figure 5:
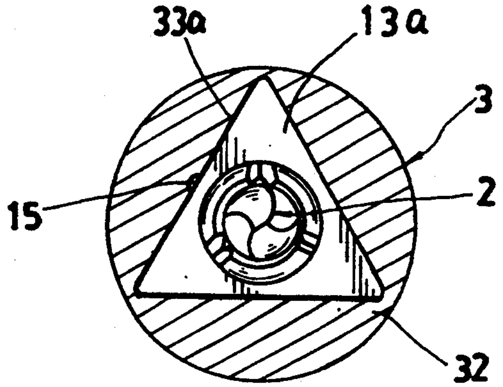
FIG. 5 is a cross sectional drawing of still another preferred embodiment of the present invention having a collar of polygonal prism shape.

The coupling socket 33 in the coupling adapter 32 of the transmission member 3 may also be formed with polygonal inside walls in the coupling socket 33 for engaging a polygonal prism such as a triangular prism as shown in FIG. 5 of the collar 13*a* of the drill 1 for coupling the coupling adapter 32 of the transmission member 3 onto the collar 13 of the drill 1.

Figure 2:
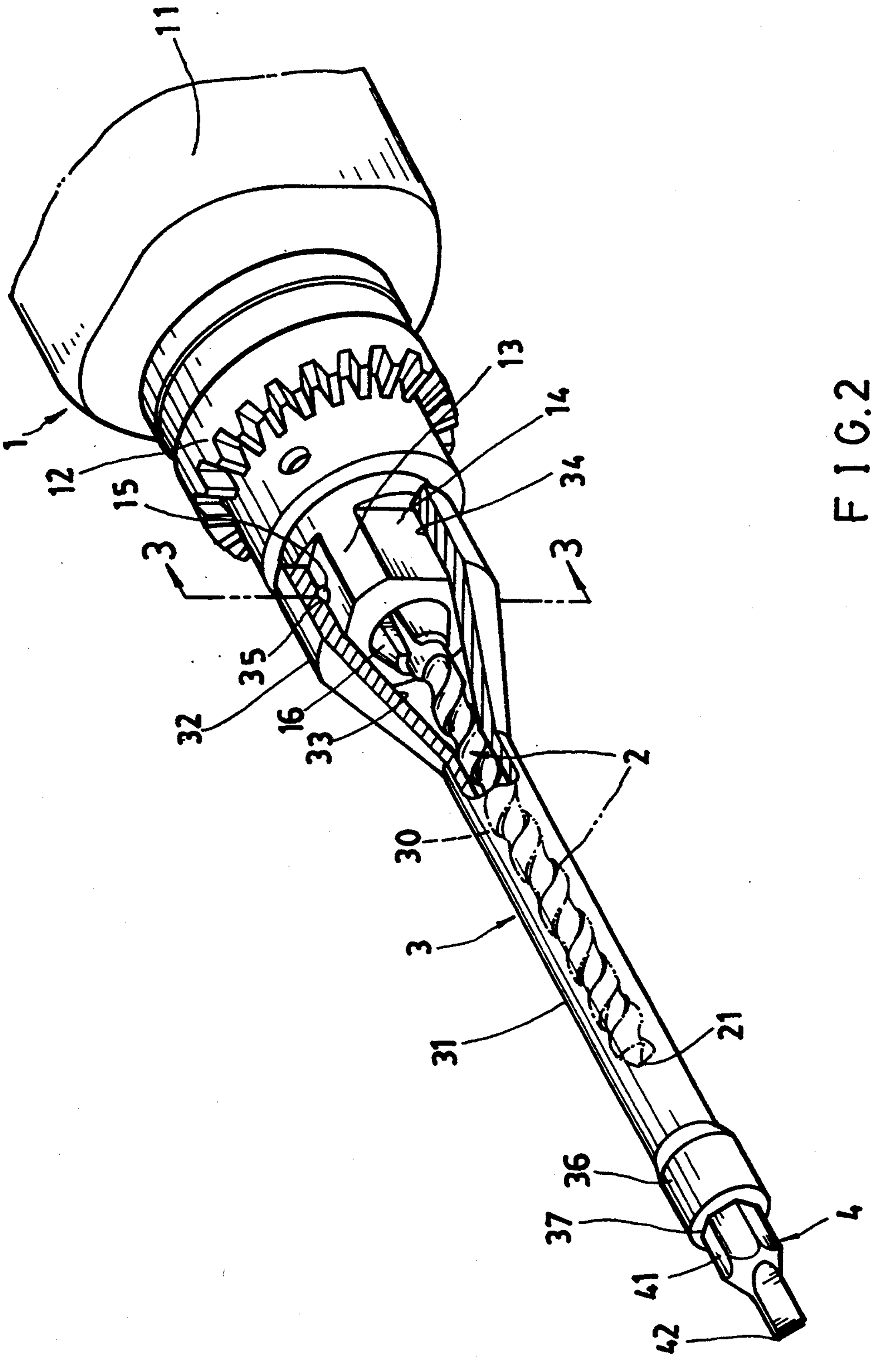
FIG. 2 is a perspective view of the present invention.
Figure 3:
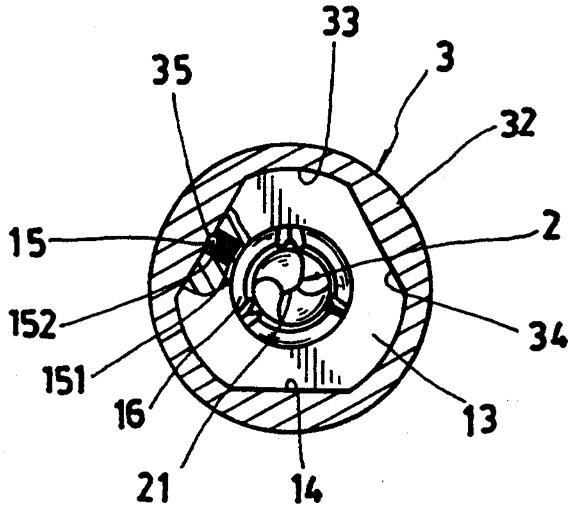
FIG. 3 is a partial cross sectional drawing of the present invention when viewed from direction 3—3 of FIG. 2.
Figure 4:
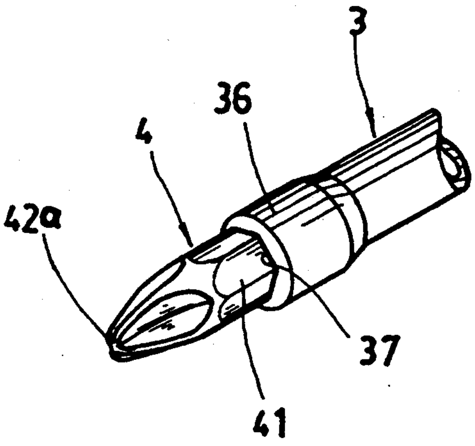
FIG. 4 is a partial illustration showing another preferred embodiment of the present invention.

The driving socket 37 of the driving head member 36 of the transmission member 3 is detachably mounted with a replaceable tool unit 4 as shown in FIGS. 2 and 4 in the driving socket 37 for an additional mechanical processing or driving use by the tool unit 4 attached to the transmission member 3 and driven by a driving motor 10 in the drill 1.

The replaceable tool unit 4 includes a base portion 41 of polygonal shape and is engageably secured in the driving socket 37 of the transmission member 3, and an actuating tip 42 protruding forwardly for mechanical processing or driving use.

The replaceable tool unit 4 is selected from a Phillips screwdriver bits as shown in FIG. 4 and slotted screwdriver bits as shown in FIGS. 1, 2.

However, the kinds of tool units 4 of this invention are not limited, and the tool units 4 may be stored in a portable kit or case for easy carrying purpose.

The hollow bore portion 30 in the sleeve member 31 of the transmission member 3 should have a length not less than a length of the drilling tool 2 without obstructing a front tip 21 of the tool 2 when disposed within the hollow sleeve member 31 as shown in FIG. 2.

The sleeve member 31 has a sleeve axis 300 longitudinally defined in a center portion of the sleeve member 31 aligned with a shaft axis (100) of a driving motor (10) in the drill housing 11 and aligned with a longitudinal axis 200 axially defined in the drilling tool 2 axially mounted on the drill 1 when securing the sleeve member 31 on the collar 13 of the drill 1.

When using the drill of the present invention for rotatably operating a screw driver, the transmission member 3 may be inserted with a tool unit 4 of screw driver, as shown in the drawing figures, in the driving socket 37 on a distal end or an outer end of the sleeve member 31 and the transmission member 3 is coupled to the drill 1 by engaging the coupling adapter 32, which is formed on the proximal or inner end of the sleeve member 31, with the collar 13 of the drill 1. The coupling adapter 32 is easily coupled to the collar 13 of the drill 1 without requiring any loosening or tightening operation of the chuck 12. The resilient ball 15 will be resiliently engaged with the ball recess 35 on the flat surface 34 of the coupling socket 33 in the coupling adapter 32 to stably retaining the transmission member 3 on the drill 1. Since the drilling tool 2 is still axially mounted on the drill, no dismantling job is required to first remove or release the drilling tool 2 from the drill 1 and the additional tool unit 4 such as a screw driver may be quickly attached to the drill 1 for a conveneint replaceable use of plural tools such as a screw driving in addition to a mechanical drilling.

The present invention may be modified without departing from the spirit and scope of this invention. The shapes and structures of the transmission member 3 and replaceable tool unit 4 are not limited in this invention.

I claim:

1. A drill means comprising:

a drill (1) having a collar (13) retained in a chuck (12) and a plurality of jaws (16) confined in the collar (13) for clamping a central drilling tool (2) in the drill (1), having a longitudinal axis (200) defined in a longitudinal center of the drilling tool (2) and aligned with a shaft axis (100) of a driving motor shaft secured in the drill (1);

a transmission member (3) having a proximal end detachably coupled to the collar (13) of the drill (1), having a distal end of the transmission member (3) opposite to the proximal end, said transmission member (3) encasing the drilling tool (2) therein when mounted to said drill (1) without first removing said drilling tool (2) as axially mounted in said drill (1), and said distal end of said transmission member (3) operatively processing and driving an external object when driven by said drill (1); said drill (1) including: at least a resilient ball (15) resiliently held in the collar (13) for resiliently frictionally retaining the transmission member (3) when coupling said transmission member (3) onto said drill (1);

said transmission member (3) including: a sleeve member (31) having a hollow bore portion (30) longitudinally formed in the sleeve member (31) for encasing the central drilling tool (2) in the hollow bore portion (30), a coupling adapter (32) formed on a proximal end of the sleeve member (31) and having a coupling socket (33) recessed in the coupling adapted (32) for coupling the collar (13) of the drill (1), a ball recess (35) recessed in the coupling socket (33) of the coupling adapter (32) and resiliently engaging the resilient ball (15) on the collar (13) of the drill (1), a driving head member (36) formed on a distal end of the sleeve member (31) opposite to the coupling adapter (32) and having a driving socket (37) generally polygonal shaped and recessed in the driving head member (36) for rotatably driving an external object when driven by the drill (1); and said coupled socket (33) in the coupling adapted (32) of the transmission member (3) formed with at least one flat surface (34) on an inside wall of the coupling socket (33), each said flat surface (34) of said coupling socket (33) engageable with at least one secant flat surface (14) longitudinally formed on the collar (13) which is generally cylindrical shaded.

2. A drill means according to claim 1, wherein said coupling socket (33) in the coupling adapter (32) of the trasmission member (3) is formed with polygonal inside walls in the coupling socket **(33*a*) for engaging a polygonal prism of the collar (13*a*) of the drill (1) for coupling the coupling adapter (32) of the transmission member (3) onto the collar (13) of the drill (1)**.

3. A drill means according to claim 1, wherein said driving socket (37) of the driving head member (36) of the transmission member (3) is detachably mounted with a replaceable tool unit (4) in the driving socket (37) for mechanical processing and driving use by the tool unit (4) as attached to the transmission member (3) and driven by a driving motor (10) in the drill (1).

4. A drill means according to claim 3, wherein said replaceable tool unit (4) includes a base portion (41) formed with polygonal shape and engageably securable in the driving socket (37) of the transmission member (3), and an actuating tip (42) protruding forwardly from said base portion (41) for mechanical processing and driving use.

5. A drill means according to claim 4, wherein said replaceable tool unit (4) is selected from Phillips screwdriver bits and slotted screwdriver bits.

6. A drill means according to claim 1, wherein said hollow bore portion (30) in the sleeve member (31) of the transmission member (3) has a length not less than a length of the drilling tool (2) without obstructing a front tip (21) of the drilling tool (2) when disposed within the hollow bore portion (30) of the sleeve member (31).

7. A drill means according to claim 1, wherein said sleeve member (31) has a sleeve axis (300) longitudinally defined in a center of the sleeve member (31), aligned with a shaft axis (100) of a driving motor (10) in the drill (1) and aligned with a longitudinal axis (200) axially defined in the drilling tool (2) axially mounted on the drill (1) when securing the sleeve member (31) on the collar (13) of the drill (1).

* * * * *